United States Patent
Corbellini

(10) Patent No.: US 8,517,225 B2
(45) Date of Patent: Aug. 27, 2013

(54) ROTARY ACTUATED LOTION PUMP

(75) Inventor: Francis Corbellini, Rue Buffon (FR)

(73) Assignee: ELC Management, LLC, New York, NY (US)

( * ) Notice: Subject to any disclaimer, the term of this patent is extended or adjusted under 35 U.S.C. 154(b) by 837 days.

(21) Appl. No.: 11/942,023

(22) Filed: Nov. 19, 2007

(65) Prior Publication Data
US 2009/0127291 A1   May 21, 2009

(51) Int. Cl.
*B65D 88/54* (2006.01)

(52) U.S. Cl.
USPC .................. 222/340; 222/383.1; 222/385

(58) Field of Classification Search
USPC .......... 222/404, 505, 401, 509, 383.1, 383.3, 222/385, 464.1, 340, 324, 383.2, 379, 382, 222/463, 139, 394, 398, 344, 390, 410
See application file for complete search history.

(56) References Cited

U.S. PATENT DOCUMENTS

| | | | | |
|---|---|---|---|---|
| 3,777,945 | A * | 12/1973 | Nozawa et al. | 222/394 |
| 3,940,029 | A * | 2/1976 | Horvath | 222/340 |
| 4,260,082 | A * | 4/1981 | Rooney et al. | 222/340 |
| 4,922,934 | A | 5/1990 | Gatti | |
| 4,991,746 | A | 2/1991 | Schultz | |
| 5,328,062 | A * | 7/1994 | Tubaki et al. | 222/385 |
| 5,492,275 | A | 2/1996 | Crampton | |
| 7,165,906 | B2 | 1/2007 | Dieudonat et al. | |
| 7,325,707 | B2 * | 2/2008 | Bougamont et al. | 222/390 |
| 2006/0043123 | A1 | 3/2006 | Byun | |

FOREIGN PATENT DOCUMENTS

| | | |
|---|---|---|
| JP | 3-22560 U | 3/1991 |
| JP | 3-70763 U | 7/1991 |
| JP | 6-7609 U | 2/1994 |
| KR | 200310093 | 4/2003 |
| KR | 200427883 | 10/2006 |
| KR | 200433595 | 12/2006 |

OTHER PUBLICATIONS

PCT International Search Report, International Application No. PCT/US08/083581; Completion Date: May 25, 2009; Date of Mailing: May 25, 2009.
PCT Written Opinion of the International Searching Authority, or The Declaration; International Application No. PCT/US08/083581; Completion Date: May 25, 2009; Mailing Date: May 25, 2009.

* cited by examiner

*Primary Examiner* — Kevin P Shaver
*Assistant Examiner* — Daniel R Shearer
(74) *Attorney, Agent, or Firm* — Peter Giancana

(57) ABSTRACT

A manually operated personal care pump, wherein a twisting motion is converted into a linear displacement that compresses the fluid in the accumulator. Pumps of this type may typically dispense between about 30 and 1000 μL of product per dose. The removal of the conventional button actuator at the top of the pump, allows the aesthetic intent of the design of the package to be carried all the way to the top of the package. It also, enables the top of the pump to serve as a customizable product applicator.

10 Claims, 4 Drawing Sheets

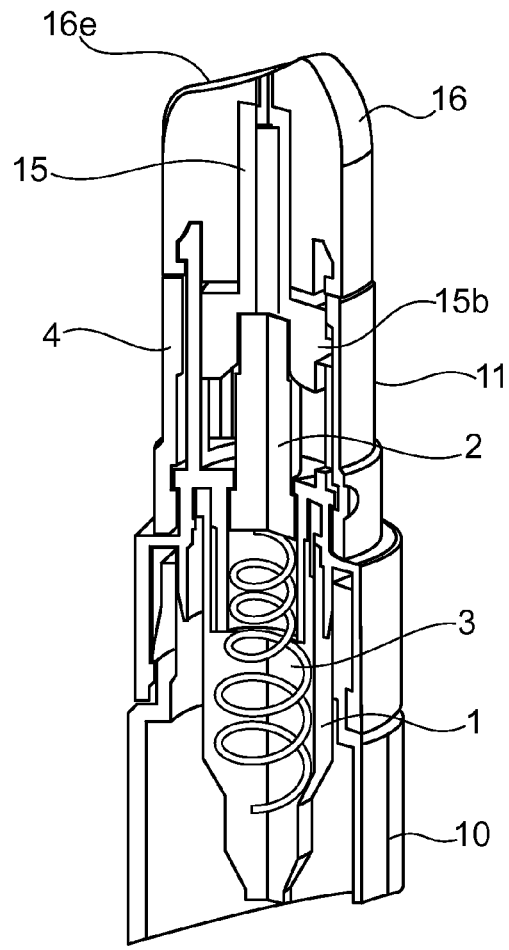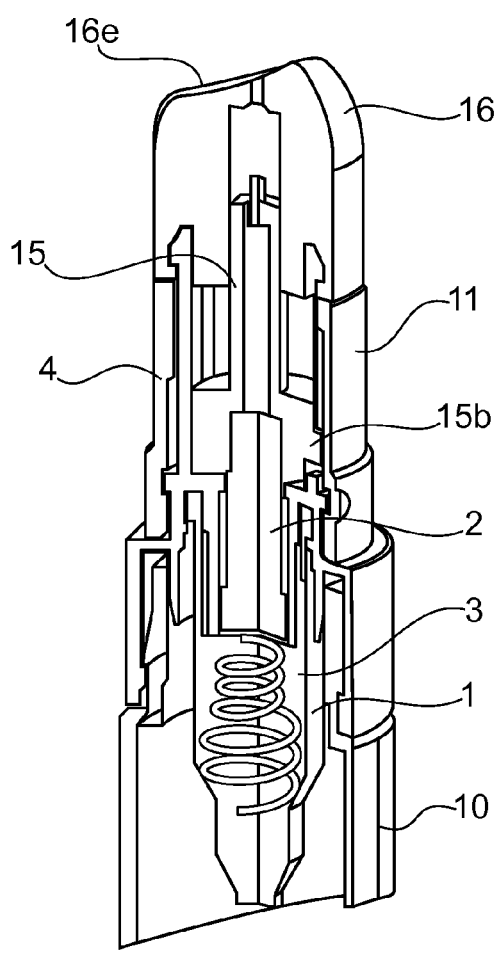
FIG. 2a
FIG. 2b

ROTARY ACTUATED LOTION PUMP

FIELD OF THE INVENTION

The present invention is in the field of dispensers for personal care products, particularly manual pump dispensers for flowable media.

BACKGROUND

Micropump dispensers are common in the personal care and cosmetics markets. A basic handheld pump dispenser (see FIG. 1) comprises an accumulator (101), a stem (102) and a spring (103) and typically dispenses between 50 and 500 μl of product (although some may dispense more or less) with each full stroke of the pump. The accumulator is a generally cylindrical body that holds the next dose of flowable product. The bottom of the accumulator has an inlet port (101a). Flowable product passes from a reservoir (110) through the inlet port, into the accumulator. A one way check valve (101c) associated with the inlet port allows product to flow into the accumulator, but discourages product or air from flowing in the opposite direction.

The top of the accumulator (101) is opened and a receives a lower portion of a hollow stem (102). The lower portion of the stem is shaped complementarily to the interior of the accumulator and is able to slide up and down in the accumulator, while maintaining liquid tight seal between the accumulator and the stem. The stem has an inlet port (102a) and an outlet port (102b). Product from the accumulator is able to flow into the inlet port of the stem, through the hollow stem, and out the outlet port of the stem. The outlet port of the stem may have a one way check valve (102c) associated with it, that allows product to flow out of the stem, but that discourages product or air from flowing in the opposite direction.

A spring (103) is disposed in the accumulator (101). The lower end of the spring is held motionless by resting against a fixed object, like the interior bottom of the accumulator. The upper end of the spring is movable and exerts a force against a lower portion of the stem (102). When the stem is in a raised position, the spring is minimally compressed. When a user presses the stem, the stem slides down into the accumulator, compressing the spring. As this happens, the one way valve (101c) of the accumulator closes off the inlet port (101a) of the accumulator and product is forced up the accumulator, through the stem and out the outlet port (102b) of the stem. When the user releases the stem, the stem slides out of the accumulator under the action of the expanding spring. As the stem slides out of the accumulator, the one way check valve (102c) of the stem closes and a vacuum is created within the accumulator. In response, product for the next dose is drawn from the reservoir (110), into the accumulator.

An actuator (111) seated on the top of the stem (102) and a dip tube (112) extending from the inlet port (101a) of the accumulator (101) into the reservoir (110), are additional components of some handheld pump dispensers, as well understood in the art. A housing (114) is used to secure the assembly of the accumulator (101) and the stem, as well as provide a means for attaching the pump to the reservoir. If the reservoir is not collapsible, then a vent (113) is provided to allow air from the ambient atmosphere to enter the reservoir. By "collapsible" reservoir, I mean that the volume of the reservoir shrinks as product is dispensed from the reservoir. A non-collapsible reservoir has a constant volume. By "atmospheric" pump, I mean a pump that allows the reservoir to draw air from the ambient atmosphere. Atmospheric pumps are typically used with non-collapsible reservoirs and typically have dip tubes. By "airless" pump, I mean a pump that does not allow the reservoir to draw air from the ambient atmosphere. Airless pumps are typically used with collapsible reservoirs and generally do not have dip tubes.

A collapsible reservoir may be implemented as a flexible container that shrinks as product is pumped from the flexible container. Alternatively, a collapsible reservoir may be implemented as a rigid container with a piston sliding therein. As product is pumped from the rigid container, the piston slides in the container so as to reduce the volume of the reservoir. These implementations are well known in the field.

Some micropumps have a locking feature that prevents the pump from dispensing accidentally. The locking feature sometimes takes the form of a rotating collar that registers opened and closed positions, such that the stem cannot be depressed when the collar is in the closed position. The rotating collar does not itself, cause the stem to move up or down.

There are also other types of packaging mechanisms common to the personal care industry, wherein a rotating collar causes a solid product to rise or fall. Lipsticks and deodorant sticks are common examples of this. Such mechanisms are not pump dispensers and are not useful for readily flowable media.

One of the more significant drawbacks of conventional micropump dispensers concerns the aesthetic. In personal care and cosmetics markets, the container on which the dispenser sits is usually relied upon to convey a particular aesthetic. Often the container is custom designed, at considerable expense. A conventional micropump dispenser is a substantial detriment to the visual appeal of the whole package. The stem and actuator protrude far above the container. The actuator accommodates a finger of the user and thus, must be of substantial size. Generally, the stem and actuator interrupt the design of the container and prohibit the design of the container from being carried through the top of the package.

In an effort to alleviate this problem, a decorative collar may be placed around the stem, to hide the stem and, perhaps a portion of the actuator. While this may hide the rather mechanical-looking stem, it does not really allow the design of the bottle to be carried into the top of the package. The stem and actuator are still a protruding distraction from the intended aesthetic. Another conventional method of dealing with this design problem is to use a so called, low profile pump; a pump that has been designed to be as short as possible, while still delivering a sufficient dose. But even low profile pumps do not completely solve the design problem because some portion of the pump still protrudes above the container. Furthermore, such low profile features are not typically available for lotion pumps.

Thus, a lotion pump wherein a stem and actuator do not detract from the aesthetic of the container and wherein the stem and actuator are easily blended into the design of the container, would be a great advantage over conventional lotion pumps. The present invention allows the design of the container to be applied through the whole package, without interruption.

Conventional lotion pumps are designed to dose product directly onto a target surface, such as a part of the body or onto a separate applicator, such as a hand, cloth or brush. Thus, lotion pumps do not usually have an integral applicator head which holds the dispensed product prior to application to the target surface. This is a disadvantage because a conventional lotion pump requires either a separate applicator or a it requires that the user get product on her hands. Getting product on the hands is often not desirable, as when the product is greasy or if the product colors the skin. A lotion pump with integral applicator head, such that a user would not have to get her hands dirty, would be an advantage over conventional lotion pumps. The present invention provides this useful feature.

Another feature of conventional lotion pumps, such as depicted in FIG. 1, is that the actuator orifice from which the dispensed product emerges is not stationary. During dispensing, the orifice is traveling downward. Thus, even if one wanted to associate an integral applicator head with a conventional lotion pump, the matter is complicated by the moving actuator orifice. This is unlike the present invention where the dispensed product emerges from a stationary orifice.

Another feature of conventional lotion pumps is a means for attaching the pump to a container of product. In FIG. 1, an example of this is the threaded closure (114). The pump is attached to and passes through the threaded closure. Often, the means of attachment is a snap fit or friction fit between the closure and the pump, such that the pump closure are readily capable of being separated.

SUMMARY

The present invention is a novel lotion pump wherein product is not dispensed by an up and down motion of any visible part. Rather, the stem is moved up and down by rotating a ring actuator. By changing the way the pump is actuated, I was able to eliminate the protruding nature of the stem and actuator, replace the conventional actuator with an integral applicator head and allow the design of the container to be easily carried to the top of the package, thus creating a whole-package design. The aesthetic improvement achieved by eliminating the protruding stem and actuator and by creating a whole-package design, may be significant.

DESCRIPTION OF FIGURES

FIG. 2a is a cross section of a rotary actuated lotion pump with stationary applicator head, with the upper stem at its upper position.

FIG. 2b is a cross section of a rotary actuated lotion pump with stationary applicator head, with the upper stem at its lower position.

DETAILED DESCRIPTION

Throughout this specification, the terms "comprise", "comprises", "comprising", "have", "has" and "having" and the like shall consistently mean that a collection of objects is not limited to those objects specifically recited.

Throughout this specification "flowable" means that, if allowed, a product is capable of deforming in response to its own weight.

Throughout the specification "personal care product" means any topical preparation that provides a benefit to the surface to which it is applied or provides a benefit to the subject to which it is applied. "Personal care product" includes cosmetic, dermatological, pharmaceutical and nutraceutical preparations.

Rotary Actuated Lotion Pump with Stationary Applicator Head

Figure 1:
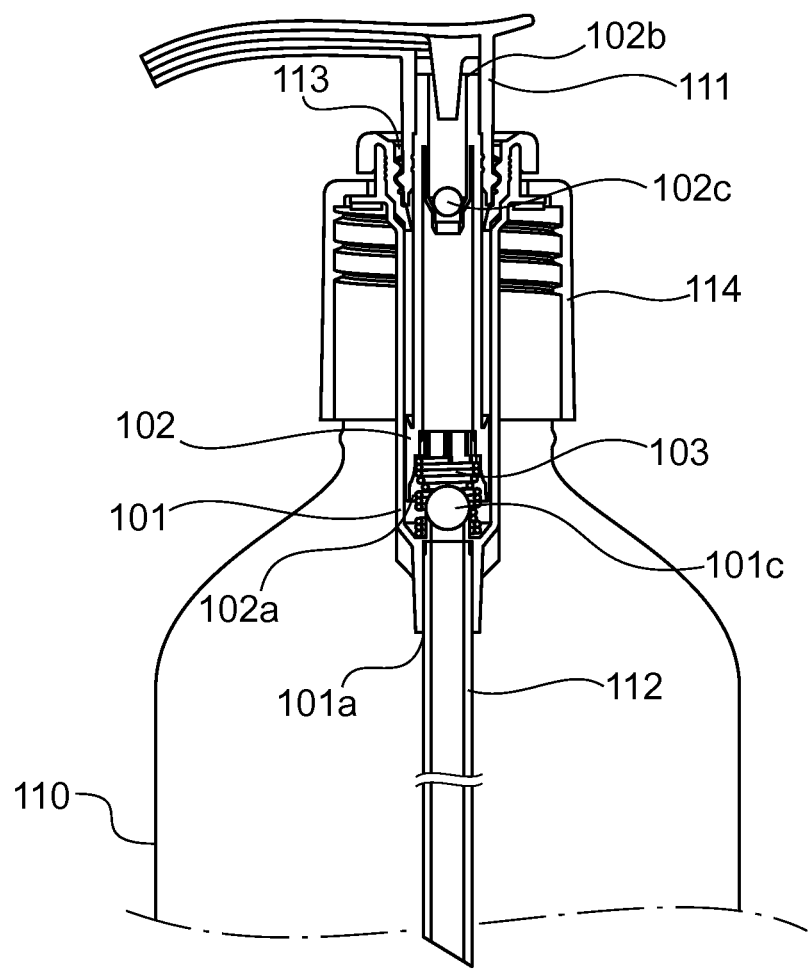
FIG. 1 depicts a conventional lotion pump dispenser and container.
Figure 3:
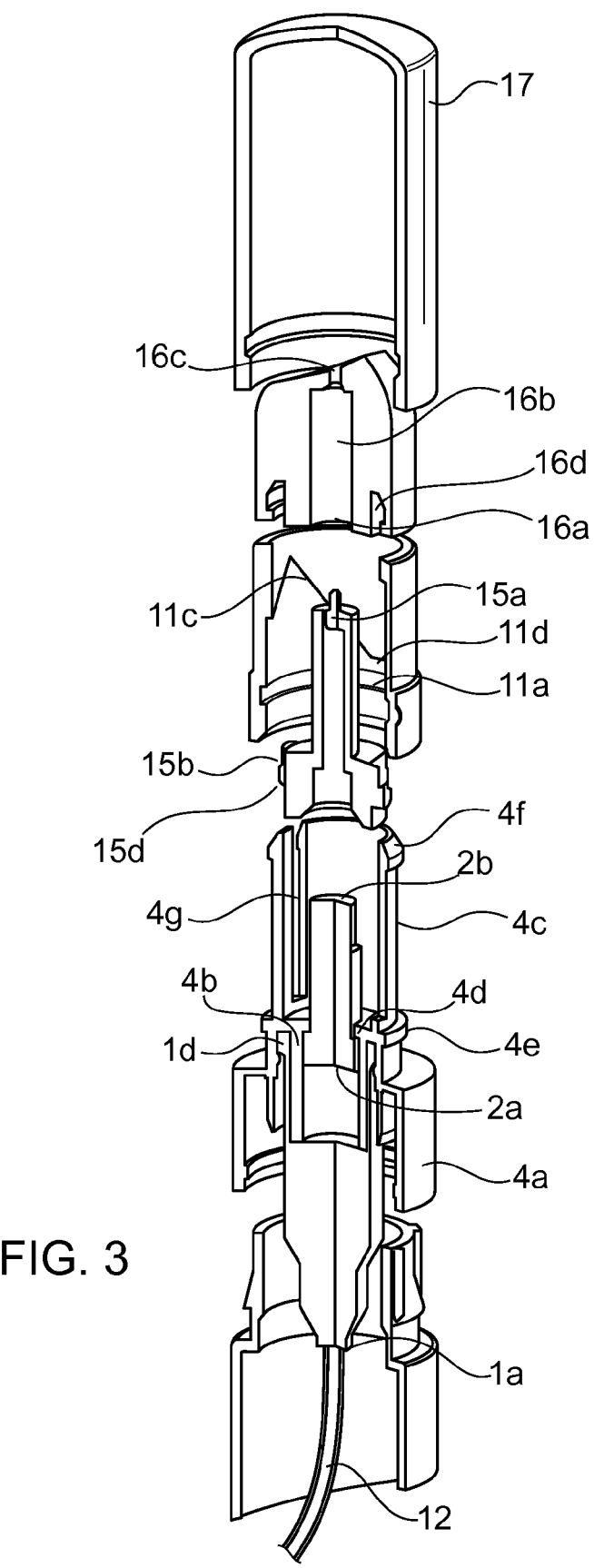
FIG. 3 is an exploded view of a rotary actuated lotion pump with stationary applicator head.

Referring to FIGS. 2a, 2b and 3, the lotion pump of the present invention comprises an accumulator (1). The accumulator is a generally cylindrical body that holds the next dose of flowable product. The bottom of the accumulator has an inlet port (1a). Flowable product passes from a reservoir (10) through the inlet port, into the accumulator. In the usual fashion, a one way check valve associated with the inlet port allows product to flow into the accumulator, but discourages product or air from flowing in the opposite direction. The top of the accumulator is opened and a receives a lower portion of the lower stem (2).

As in a conventional pump, a housing helps to hold together, the pump assembly (accumulator, lower stem, spring, etc). However, the housing (4) of the present invention is significantly different from anything in the prior art. The housing has a lower portion (4a) which is attaching to the reservoir (10). For example, a lower portion of the housing may comprise screw threads compatible with threads found on the reservoir. Alternatively, the housing may form an effective snap-fit onto the reservoir.

Inside the housing (4), a means is supplied for attaching to the accumulator (1). A person skilled in the art will appreciate that many forms of snap fit connection may be imagined. One, non-exclusive version, is shown in FIGS. 2 and 3, wherein an upper portion (1d) of the cylindrical wall of the accumulator is sandwiched between the outside wall and an inner depending wall (4b) of the housing. The housing is further described, below, as needed.

As mentioned, the top of the accumulator (1) is opened and a receives a lower portion of the lower stem (2). The lower stem is hollow. In one embodiment, a lower portion of the lower stem is shaped complementarily to the interior of the accumulator, and is able to slide up and down in the accumulator, while maintaining liquid tight seal between the accumulator and the lower stem. In another embodiment (shown in FIGS. 2 and 3), a lower portion of the lower stem is shaped complementarily to the interior of the depending wall (4b) of the housing (4), and is able to slide up and down while maintaining liquid tight seal with the depending wall of the housing. Also, as FIG. 3 shows, the lower stem is prevented from coming completely out of the accumulator by an inward extension (4d) of the housing. Of course, other means may be used to achieve the same effect.

The lower stem has an inlet port (2a) and an outlet port (2b). Product from the accumulator (1) is able to flow into the inlet port of the lower stem, through the lower stem, and out the outlet port of the lower stem.

A spring (3) is disposed in the accumulator (1). (The spring is not shown in FIG. 3, for clarity). The lower end of the spring is held motionless by resting against a fixed object, like the interior bottom of the accumulator. The upper end of the spring is movable and exerts a force against a portion of the lower stem (2). When the lower stem is in a raised position, the spring is minimally compressed. When the lower stem is forced down, the lower stem slides into the accumulator, compressing the spring. As this happens, the one way valve of the accumulator closes off the inlet port (1a) of the accumulator and product is forced up the accumulator, through inlet port (2a) and out the outlet port (2b) of the lower stem. When downward force is removed from the lower stem, the lower stem slides upward, relative to the accumulator, under the action of the expanding spring.

The accumulator (1), lower stem (2) and spring (3), as so far described, may be implemented in completely conventional fashion. One of the advantages of the present invention is the ability to construct a rotary actuated lotion pump by building on a pre-assembled conventional lotion pump. Virtually any pre-assembled, commercially available lotion pump may be modified as described herein, to create a rotary actuated lotion pump. This is a great advantage, because an existing product, one already on the market, for example, can be updated without having to change the configuration of the container, closure and pump. Of course, it is also possible to implement the principles of the present invention by custom designing the accumulator, stem and/or spring.

Returning to the housing (4), a main difference between the housing of the rotary actuated pump and a conventional pump housing, is the height of the skirt (4c), which is much higher in the rotary actuated pump design. The outside wall of the skirt has an annular part (4e) for forming a snap fit to the ring actuator (11, see below). The outside wall of the skirt provides a surface about which the ring actuator rotates. A second snap fitment feature (4f) is located near the top of the skirt, and is for attaching the stationary applicator head (16) to the housing. Furthermore, one or more vertical grooves (4g) are provided in the skirt portion of the housing, for receiving the tenon(s) of the upper stem (15). The tenon-groove combination prevents the upper stem from rotating and guides the upper stem in an up and down motion.

A novel feature of the present invention is the hollow upper stem (15). The upper stem effectively sits on top of the lower stem (2) and extends the flow path. Product emerging from the outlet port (2b) of the lower stem enters the upper stem. Preferably, the upper stem makes a fluid tight seal with the lower stem. The bottom of the upper stem may be provided with a recess that receives the top of the lower stem, in a snap-fit or friction-fit, fluid tight seal. Any suitable means may be used, such that the upper stem moves up and down with the lower stem. Product flows up the interior of the upper stem and emerges from an outlet port (15a) at the top of the upper stem. The upper stem is provided with one or more tenons (15b) that extend through, and slide within, the one or more vertical grooves (4g) of the housing. The tenon-groove combination prevents the upper stem from rotating and guides the upper stem in an up and down motion.

A stationary applicator head (16) is made stationary with respect to the housing (4) by any suitable means, such as cooperation between the second snap fitment feature (4f) of the housing and a complementary feature (16d) on the applicator head. The applicator head has flow communication with the upper stem (15). For example, a top portion of the upper stem may extend into a lower inlet (16a) in the applicator head. In this case, the top portion of the upper stem is able to slide up and down within the lower inlet of the stationary applicator head, without coming out of the applicator head. The lower inlet of the applicator head continues as a channel (16b), passing through the applicator head to the outside. Product that emerges from the upper stem enters and passes through the channel of the applicator head. The product emerges from an orifice (16c) at the top end of the channel. Because a user's finger is not positioned at the top of the applicator head, as with a conventional lotion pump, the product is free to accumulate on the exterior of the applicator head prior to transfer to a target surface. Advantageously, the applicator head surface (16e) may be customized to receive, hold and transfer the product that emerges from within the lotion pump. Preferably, the applicator head surface is sized to accommodate at least one dose of dispensed product (i.e. from 30 to 1000 µL). Accommodating the quantity of product dispensed means that the applicator head is sufficiently large that it is able to hold all of the dispensed flowable product, for an indefinite period of time, without the product running off of the applicator head. Optionally, the applicator head may be sized to accommodate more than on dose of dispensed product. Optionally, the applicator head may be shaped according to the target area, to facilitate the transfer of product. For example, a lipstick bullet shape may be used for a lip product. Optionally, the surface of the applicator head may be provided with tactile details that create a desired feel or that perform a mechanical function. For example, flocking may be provided to give a luxurious feel; coarseness may be provided to perform exfoliation. Optionally, the surface of the applicator head my be heated to provide a benefit to the product and/or user. Transfer of product may be effected by drawing the loaded applicator head across the target surface.

In one alternative embodiment, a flexible conduit is provided between the upper outlet (15a) of the upper stem (15) and the lower inlet (16a) of the applicator head (16). Thus, while the upper stem moves up and down, the flexible conduit allows the exit orifice of the applicator head to be stationary.

A main reason for having the upper stem (15) is to add height to the package. The added height provides a place for a ring actuator (11). The rotary actuated pump has no actuator in the conventional sense understood in the art. Such conventional actuators are sometimes called a "button" actuator, because they are operated by pressing. This is unlike the present invention, which uses a novel rotating actuator. In general, the rotating actuator is a component that may be turned by a user to effect a linear displacement of the lower stem (further into the accumulator), thereby compressing the product in the accumulator. As will be seen, the rotating actuator may also effect the linear displacement of the lower stem out of the accumulator.

A preferred embodiment of the rotating actuator is a ring actuator. The rotating or ring actuator surrounds a portion of the upper stem (15) and surrounds the lower portion of the skirt (4c) of the housing (4). The inner wall of the ring actuator has an annular groove (11a) that receives the annular part (4e) of the skirt. This configuration dissuades the ring from moving axially, but allows the ring to rotate along the outside wall of the skirt.

In the abstract, the ring actuator (11) and the upper stem (15) have a cooperation, such that, as the ring actuator is rotated, the upper stem is downwardly displaced, pushing the lower stem (2) further into the accumulator (1). As the rotation or twisting of the ring actuator continues, the upper stem and lower stem reach the bottom of their vertical travel, at which time the downward force exerted on the them may be removed or lessened. When that occurs, the upper and lower stems return to a raised position under the action of the spring (3). Further twisting of the ring actuator, again displaces the upper and lower stems downwardly. Thus, the rotary actuated lotion pump converts a twisting motion into a reciprocating linear motion. In fact, by "rotary actuated lotion pump", I mean a manually operated personal care pump, wherein a twisting motion is converted into a linear displacement that compresses the fluid in the accumulator. Furthermore, by "rotary actuated lotion pump", I mean a manually operated personal care pump that dispenses between about 30 and 1000 µL of product, each time the fluid in the accumulator is compressed. While the principles of the present invention may be adapted to pumps that dispense larger quantities of flowable product (pumps outside of the personal care market), the increased size and complexity of those pumps are expected require customizations beyond what is described herein.

As noted, the ring actuator (11) and the upper stem (15) cooperate to convert the twisting motion of the ring actuator into linear motion of the upper stem. The upper stem travels between an upper position and a lower position. This may be achieved by a variety of methods. For example, the ring actuator and upper stem may form a cam and cam-follower mechanism. One implementation of this provides the inner surface of the ring actuator, with a raised track, while the upper stem is provided with one or more guides (15d) that extend from an outer surface of the upper stem, through the vertical groove(s) (4g) of the housing (4), to abut the raised track of the ring actuator. Preferably, the guide of the upper stem is an extension of the tenon (15b), which already passes through the vertical groove of the housing. However, the guide may be separate from the tenon. A first part (11c) of the track is declined, that is, a first part of the track extends at an angle from near the top of the ring actuator to near the bottom of the ring actuator, forming a ramp. When a guide is in this first part of the track, the guide is below the ramp, i.e. as a user turns the ring actuator, the ramp pushes down on the guide, urging the upper stem downward.

At this point, various options are possible. For example, it is possible to configure the parts so that, when the upper stem (15) is at the bottom of its travel, one could twist the ring actuator (11) in the opposite direction so that the upper stem is able to rise under the action of the spring (3).

Alternatively, when the upper stem (15) reaches the bottom of its travel, a second part (11d) of the track of the ring actuator (11) becomes horizontal so that, with further rotation of the ring actuator, the upper stem is not pushed lower, nevertheless, the upper stem cannot immediately return to the raised position.

Alternatively, when the upper stem (15) reaches the bottom of its travel, further twisting of the ring actuator (11), in the same direction, could allow the upper stem to rise. This may be achieved in different ways. For example, a third part of the track may be vertical, so that the upper stem rises quickly under the force of the spring (3), or a third part of the track may incline at an angle, such that the guide of the upper stem is below the incline of the track. In this case, the upper stem rises slowly under the action of the spring, as the ring actuator is rotated. Alternatively, a third part of the track may incline at an angle, such that the guide of the upper stem is above the incline of the track. Twisting the ring actuator now exerts an upward force on the upper stem. Of course, in this embodiment, the spring (3) in the accumulator would not be needed, but its presence would not prevent the device from functioning. In any of these embodiments, continual twisting results in repeated pumping of the stem and dispensing of product.

It may be noted that if any portion of the track is vertical, then it will impossible to twist the ring actuator (11) continuously in one direction. This is because twisting in one of the directions would run the guide (15b) into the vertical wall. Thus, if twisting in either direction is desired, vertical portions in the track should be avoided.

As with a conventional lotion pump, a "dose" of product corresponds to one up and down stroke of the stem. The degree of twisting required to make the upper stem travel from its upper position to its lower position, depends on the distance between the upper and lower position (i.e. the length of the stroke), the length of the raised track of the rotating actuator, and the diameter of the rotating actuator. Preferably, one stroke of the upper stem may be achieved by no more than a 360° rotation of the actuator. More preferably, one stroke of the upper stem may be achieved by no more than a 180° rotation of the actuator.

Rotary Actuated Lotion Pump with Movable Applicator Head

Figure 4:
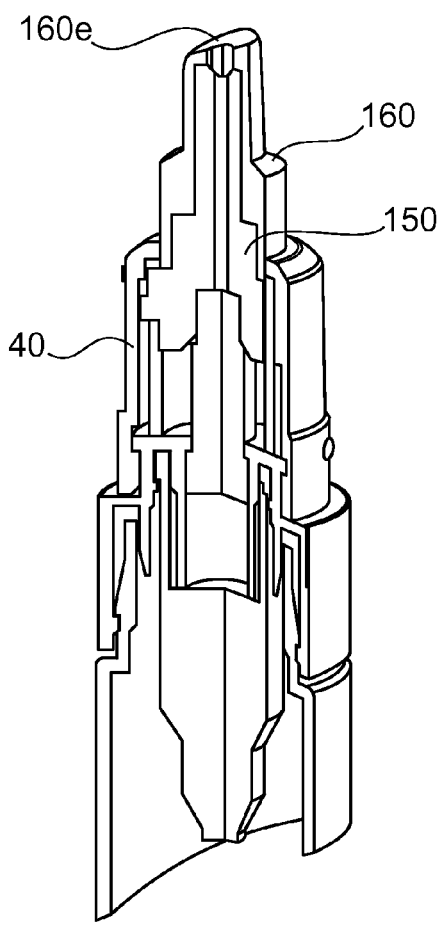
FIG. 4 is a cross section of a rotary actuated lotion pump with movable applicator head.
Figure 5:
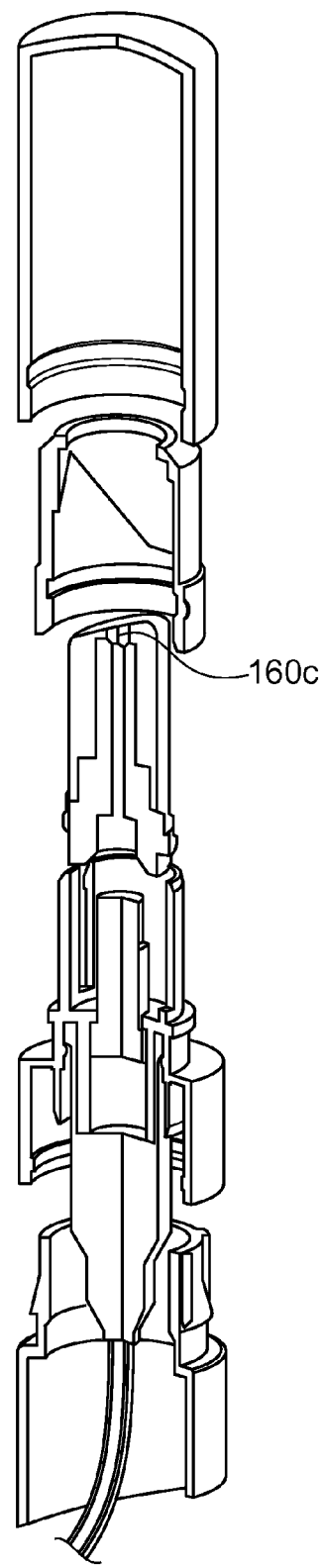
FIG. 5 is an exploded view of a rotary actuated lotion pump with movable applicator head.

The rotary actuated pump of FIGS. 4 and 5 is very similar to that of FIGS. 2 and 3, the principle difference being in the configuration of the applicator head (160) and its cooperation with the upper stem (150) and with the housing (40). In this embodiment, the applicator head is movable with respect to the housing, but stationary with respect to the upper stem. The applicator head is made stationary with respect to the upper stem by any suitable means, such as cooperating snap fitments or by integrally molding the two parts. Thus, as the upper stem moves up and down, so too does the applicator head. In this embodiment, the applicator head is not fixedly attached to the housing. As before, the moving applicator head has flow communication with the upper stem and product that emerges from the upper stem enters and passes through the applicator head to emerge from an orifice (160c) at the top end of the channel. Because a user's finger is not positioned at the top of the applicator head, as with a conventional lotion pump, the product is free to accumulate on the exterior of the applicator head prior to transfer to a target surface. Advantageously, the applicator head surface (160e) may be customized to receive, hold and transfer the product that emerges from within the lotion pump. Preferably, the applicator head surface is sized to accommodate the quantity of product dispensed (i.e. from 30 to 1000 μL). Optionally, the surface of the applicator head may be provided with tactile details that create a desired feel or that perform a mechanical function. For example, flocking may be provided to give a luxurious feel; coarseness may be provided to perform exfoliation. Optionally, the surface of the applicator head my be heated to provide a benefit to the product and/or user. Transfer of product may be effected by drawing the loaded applicator head across the target surface.

Other Features

If the reservoir (10) is not collapsible, then a dip tube (12) extending from the inlet port (1a) of the accumulator (1) into the reservoir, is provided. A vent is also provided to allow air from the ambient atmosphere to enter the reservoir. If the reservoir is collapsible, then a dip tube is typically not needed. By collapsible reservoir, I mean either a non-rigid reservoir whose outer dimensions change as product is pumped from the reservoir or a rigid reservoir, wherein the volume of the product-holding portion changes, as product is pumped from the reservoir. An example of the former is a pump-in-bag configuration. An example of the former, is a reservoir with a piston. Both, are known in the art.

As described above, the upper and lower stems (15, 2) are separate. As long as the upper and lower stems maintain flow communication, they may be formed separately or integrally, as one piece. The advantage of two pieces is that the lower stem may be the existing stem of a conventional lotion pump, which is being converted into a rotary actuated pump. Thus, any conventional lotion pump may be converted to a rotary actuated pump of the present invention, by taking the accumulator-stem-spring assembly of the conventional lotion pump, and fitting it with a housing (4), upper stem and rotating actuator (11), as described herein.

The removal of the conventional button actuator at the top of the pump, allows the aesthetic intent of the design of the package to be carried all the way to the top of the package. The reservoir or outer container and the rotary actuated pump can come together in one integral design, without being interrupted by a protruding stem and actuator. This is not achievable with conventional lotion pump packages. The aesthetic improvement achieved by eliminating the protruding stem and actuator and by creating a whole-package design, may be significant.

Removal of the conventional button actuator at the top of the pump, also enables the top of the pump to serve as a customizable product applicator.

The aesthetic improvement achieved by eliminating the protruding stem and actuator and by creating a whole-package design, may be significant.

A cap (17) may be provided to protect the applicator head and to seal the product from the ambient atmosphere. The cap may secure to the ring actuator or to the housing.

In the following claims, to make the claim language concise, components of the invention may be recited in the singular, even when multiple components of the same type may be used, as described in the specification.

What I claim is:

1. A manually operated, personal care, rotary actuated lotion pump comprising:
   an accumulator capable of holding between about 30 and 1000 μL of flowable product;
   a hollow lower stem slidably disposed in the accumulator;
   a housing fixedly attached to the accumulator and having a vertical groove;
   an applicator head that is stationary with respect to the housing, comprising:
      a channel that has a lower end that is in flow communication with the accumulator through the lower stem, and a top end that has an orifice that opens onto to the exterior of the applicator head;
   a ring actuator comprising a raised track on an inner surface, wherein a first part of the raised track is a ramp that extends at an angle from near the top of the ring actuator to near the bottom of the ring actuator;
   a hollow upper stem that sits on top of the lower stem, and that has a guide that extends through the vertical groove of the housing and abuts the raised track, such that when the guide is in this first part of the track, the guide is below the ramp,
   such that when the ring actuator is twisted in one direction, the upper stem moves down, which downwardly displaces the lower stem into the accumulator, which forces product out of the accumulator and onto the exterior of the applicator head without moving the applicator head with respect to the housing; and when the ring actuator is twisted in the other direction, the upper stem moves up.

2. The pump of claim 1 wherein the applicator head is sized to accommodate from about 30 to 1000 μL of fluid product.

3. A pump package comprising:
   a rotary actuated lotion pump according to claim 1;
   a reservoir capable of holding a flowable product.

4. The pump package of claim 3 wherein the reservoir is collapsible.

5. The pump package of claim 3 wherein the reservoir is not collapsible.

6. A manually operated, personal care, rotary actuated lotion pump comprising:
   an accumulator capable of holding between about 30 and 1000 μL of flowable product;
   a hollow lower stem slidably disposed in the accumulator;
   a housing fixedly attached to the accumulator and having a vertical groove;
   an applicator head that is stationary with respect to the housing, comprising:
      a channel that has a lower end that is in flow communication with the accumulator through the lower stem, and a top end that has an orifice that opens onto to the exterior of the applicator head;
   a ring actuator comprising a raised track on an inner surface, wherein a first part of the raised track is a ramp that extends at an angle from near the top of the ring actuator to near the bottom of the ring actuator;
   a hollow upper stem that sits on top of the lower stem, and that has a guide that extends through the vertical groove of the housing and abuts the raised track, such that when the guide is in this first part of the track, the guide is below the ramp,
   such that when the ring actuator is twisted in one direction, the upper stem moves from an upper position, to a lower position, and then back toward an upper position, which downwardly displaces the lower stem into the accumulator, which forces product out of the accumulator and onto the exterior of the applicator head without moving the applicator head with respect to the housing.

7. The pump of claim 2 wherein the applicator head is sized to accommodate from about 30 to 1000 μL of fluid product.

8. A pump package comprising:
   a rotary actuated lotion pump according to claim 2;
   a reservoir capable of holding a flowable product.

9. The pump package of claim 8 wherein the reservoir is collapsible.

10. The pump package of claim 8 wherein the reservoir is not collapsible.

* * * * *